April 18, 1961 J. O. EAMES 2,980,220
LIQUID COOLED FRICTIONAL MECHANISM
Filed Jan. 2, 1959 2 Sheets-Sheet 1

INVENTOR
JAMES OWEN EAMES
BY Scrivener & Parker
ATTORNEY

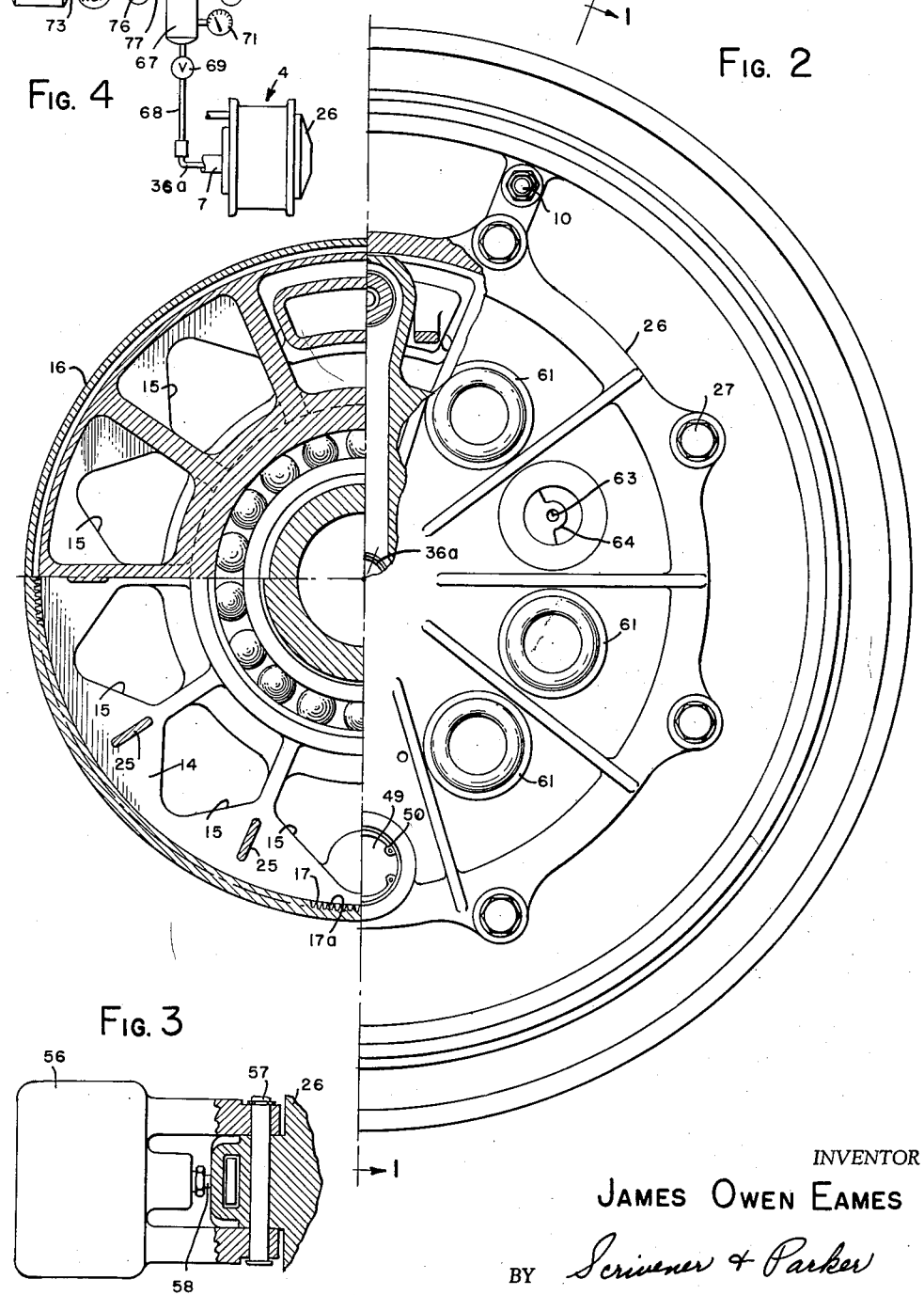

United States Patent Office 2,980,220
Patented Apr. 18, 1961

2,980,220

LIQUID COOLED FRICTIONAL MECHANISM

James Owen Eames, P.O. Box 400, Washington, Conn., assignor to Roy S. Sanford, Wilfred A. Eaton, and Erling D. Sedergren, all of Woodbury, Conn., and Roger H. Casler and James O. Eames, both of Washington, Conn.

Filed Jan. 2, 1959, Ser. No. 784,666

11 Claims. (Cl. 192—113)

This invention relates to frictional mechanism, and more particularly to liquid cooled frictional mechanism such as brakes and clutches.

The excessive heat developed in frictional mechanisms of this type has caused many difficulties in the past, and it is accordingly one of the objects of the invention to provide means for overcoming these difficulties.

Another object of the invention is the provision of novel cooling means for frictional mechanisms of the above type.

Yet another object of the invention is to provide, in a frictional mechanism of the above type, means for controlling the supply of cooling liquid to the mechanism.

Still another object of the invention is to provide means for utilizing the heat of vaporization of the cooling liquid to dissipate heat from the frictional mechanism.

These and other objects and features of the invention will be more readily apparent from the following detailed description when taken in connection with the accompanying drawings. It is to be expressly understood, however, that the description and drawings are not to be taken as defining the limits of the invention, reference being had for this purpose to the appended claims.

In the drawings, Fig. 1 is a sectional view in side elevational of a frictional mechanism constructed in accordance with the principles of the invention, the section being taken along line 1—1 of Fig. 2;

Fig. 2 is a view, partially in section, of the mechanism shown in Fig. 1 taken along line 2—2 of Fig. 1;

Fig. 3 is a fragmentary view, partially in section, taken along line 3—3 of Fig. 1, and Fig. 4 is a diagrammatic view of a brake system constructed in accordance with the principles of the invention.

Figure 1:
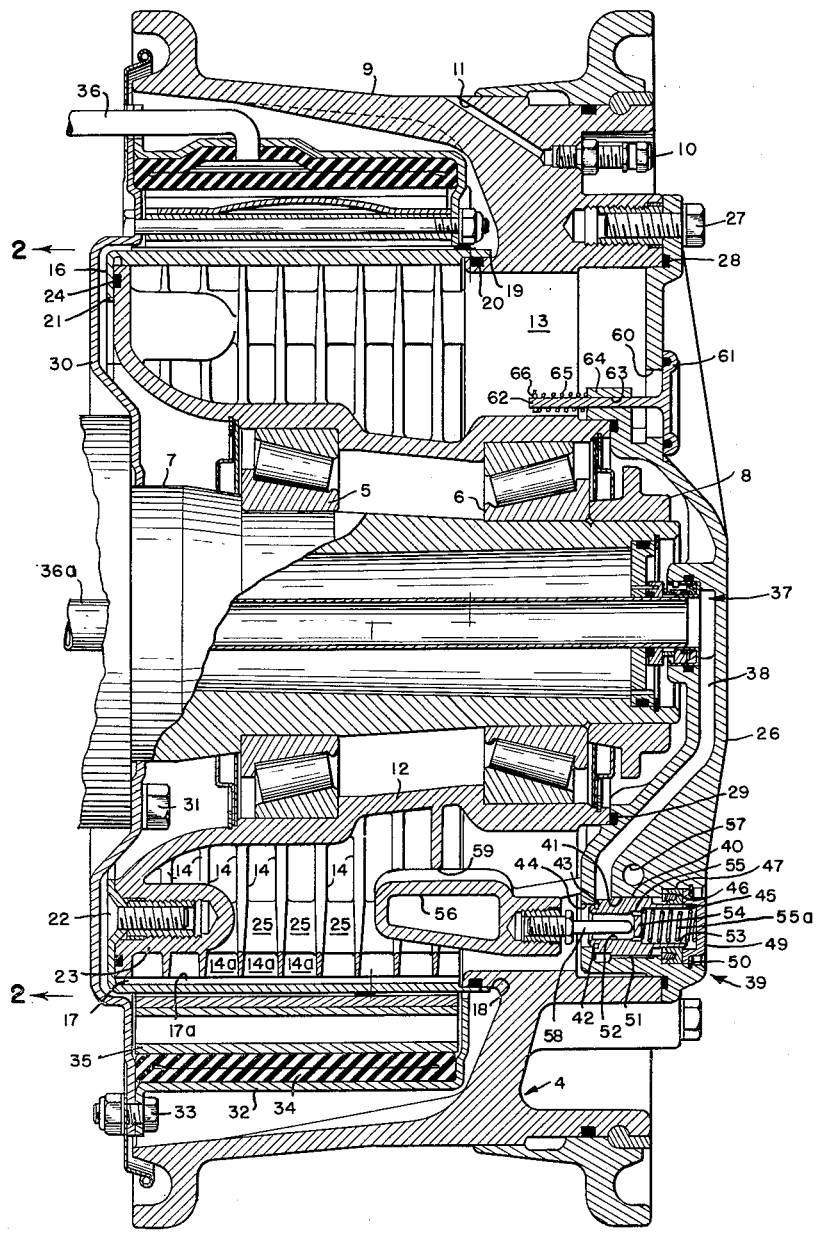

Referring more particularly to Fig. 1 of the drawings, the mechanism includes in general a wheel 4 rotatably mounted as by means of bearings 5 and 6 on an axle 7 and being retained thereon by means of a nut 8. In the embodiment shown, the outer periphery of the wheel is provided with a rim portion 9 adapted to receive a pneumatic tire of the tubeless type, a tire valve 10 and a passage 11 being provided for inflation of the tire. The wheel is provided with a central hub portion 12 in which the bearings are mounted, and this hub portion forms the inner wall of a cooling liquid chamber 13. A plurality of annular partitions or ribs 14 extend outwardly from the hub portion forming annular cooling liquid passages 14a therebetween, these ribs, as shown more particularly in Fig. 2, being provided with a plurality of substantially triangular openings 15 for purposes to be more fully described hereinafter. A cup-shaped metal friction element 16 is mounted on the wheel, the interior surface of the element being formed as an internal gear having V-shaped teeth 17 in supporting engagement with the peripheries of the partitions 14. Valleys 17a between the teeth serve to connect adjacent annular passages 14a. An external cylindrical surface 18 is formed on the wheel as shown, and the right end of the element 16 is provided with a bore 19 slidably mounted on the surface 18, leakage being prevented by means of a suitable sealing ring 20. At the left end of the element, a flange 21 is provided and maintained in engagement with the left end of the wheel 4 as by means of cap screws 22 which are threadedly received by bosses 23 on the wheel. As shown, a sealing ring 24 is provided for sealing the junction of the flange 21 and the left end of the wheel 4. The annular partitions are preferably connected together by webs or ribs 25 as shown.

The right end of the chamber 13 is closed by means of an end plate 26 secured to the wheel as by means of cap screws 27, the plate abutting the right end of the wheel adjacent the outer periphery thereof and also abutting the right end of the hub portion of the wheel, sealing rings 28 and 29 being provided to prevent leakage at these junctions. Thus, the chamber 13 is defined by the hub portion 12, the cup-shaped friction element 16, and the end plate 26, thus forming a closed chamber for cooling liquid with the inner surface of the cylindrical friction element 16 being exposed in the chamber. Thus a rotatable drum member is formed having an annular cooling liquid chamber therein.

Actuator mechanism is provided for the brake including an actuator supporting plate 30 secured to the axle 7 by means of cap screws 31, cylindrical actuator carrying member 32 secured to the carrier plate by means of bolts 33 and having an expander tube of conventional construction 34 secured to the inner cylindrical surface thereof. Externally contracting brake shoes 35 are provided in conventional manner, and on application of fluid under pressure to the expander tube through an actuator conduit 36, the expander tube is expanded to effect engagement of the brake shoes with the outer surface of the metal friction element 16 as will be well understood by those skilled in the art. It will be understood that the brake shoe arrangement and the expander tube are conventional, and that they form no part of the present invention.

The mechanism of the present invention contemplates the dissipation of heat from the mechanism at a very high rate by boiling the cooling liquid in the brake mechanism and discharging the resulting vapor or steam directly to atmosphere, such a mechanism being particularly adapted, as will be further explained hereinafter, to the wheels of airplanes. To this end, it is desirable to provide means for controlling the amount of cooling liquid in the frictional mechanism, and for insuring that the mechanism at all times will be supplied with the proper amount of cooling liquid to meet the conditions of operation. Thus, as will be described, means are provided for insuring that there will be cooling liquid at all times in the frictional mechanism regardless of the conditions of operation, and means are provided for preventing an excess of cooling liquid from entering the frictional mechanism and being discharged in the form of liquid to atmosphere. Means are also provided for preventing any appreciable degree of unbalance in the rotating portion of the mechanism.

Referring again to Fig. 1, the means for supplying cooling liquid to the mechanism includes a stationary inlet conduit 36a extending through the axle 7 and supported thereby, the right end of the conduit extending through a rotary seal mechanism 37 associated with the right end of the axle 7 and also with the end plate 26, this seal serving to prevent leakage between the conduit 36a and the plate 26 when the latter is rotating. An inlet passage 38 is formed in the end plate 26, being connected at its radially inner end with the right end of the conduit 36, and being connected at its outer end to an inlet valve mechanism 39.

The inlet valve is of the balanced type, and includes a valve 40 slidably mounted in a bore 41 is the cover plate, the bore being substantially parallel to the axis of rotation of the drum member. The left end of the valve is provided with a resilient seat 42 as shown, adapted to engage a valve seat 43 formed in a bore 44 formed in the cover plate 26 and connected at its left end with the cooling liquid chamber 13 as shown. The right end of the valve is provided with a portion 45 of reduced diameter, this portion being arranged to slide through a U-shaped seal 46 mounted in a bore 47 in the cover plate and held in place by means of a cover 49 and a snap ring 50. The valve portion 45 has a diameter substantially identical with the effective diameter of the valve seat 43 on the left end of the valve, and a groove 51 formed in the wall for the bore 41 serves to equalize the pressure of the liquid in the passage 38 at both ends of the valve. The valve is provided with bores 52 and 53 separated by a wall 54 provided with equalizing ports 55, a spring or resilient biasing means 55a being interposed between the wall and the inner surface of the cover 49, thus urging the valve at its left end against the seat 43 of the bore 44. The equalizing ports 55 serve to equalize the pressures at both ends of the valve due to the pressure of the liquid in the cooling chamber 13, and since the areas acted on by this liquid at either end of the valve are equal, the forces exerted by the pressure on the valve in opposite directions are equal both with respect to the pressure of the liquid in the chamber 13 and to the pressure of the liquid in the passage 38. Consequently the operation of the valve is entirely independent of these pressures and is controlled only by other means as will be described.

In order to provide for operation of the valve and for the control of the liquid level in the mechanism, a float 56 is pivotally mounted on a shaft 57 in the cover plate, the float extending into the chamber 13 at the right end thereof as shown, the partitions 14 in this region being cut away to provide room for the float. At the right end of the float, a valve operating stem 58 is provided, being screwed into the float at the left end of the stem and having its right end entered into the bore 52 of the valve and adapted to abut the wall 54 of the valve. As shown, clockwise rotation of the float from the position shown is prevented by an abutment 59 on one of the partitions 14, it being understood that on downward movement of the float in a counterclockwise direction about the shaft 57, the stem 58 will move the valve to the right to open the port 44 and provide communication between the inlet cooling liquid passage 38 and the cooling liquid chamber 13. When the float is again moved to the position shown, assuming for the moment that the drum member is in the position of rotation shown with the valve at the extreme bottom of the member or at bottom dead center, the valve will again close.

In order to provide for the discharge of vapor or steam from the mechanism at a predetermined pressure, the plurality of exhaust ports 60 are provided in the cover plate 26, and although eight of these ports are indicated, it will be understood that any suitable number can be utilized. These ports are closed normally by relief valves 61 having stems 62 slidably mounted in bores 63 formed in bosses 64 on the end plate, the left ends of the stems being provided with springs 65 interposed between the left ends of the bosses and snap rings 66 on the stems, the springs thus serving to maintain the valves in closed position as shown until the pressure in the chamber exceeds a predetermined value for which the springs are chosen. Although a pressure of 5 lbs. is contemplated, it will be understood that any suitable pressure can be utilized by selecting the proper valve areas and the proper valve springs.

Referring now to Fig. 4, means are shown for supplying cooling liquid from a source to the frictional mechanism, this means including a liquid reservoir 67 connected to the inlet tube or conduit 36 by means of a conduit 68, a shut-off valve 69 being provided in this conduit to permit closing off the supply of liquid when the brake is removed for servicing. The reservoir is provided with a filler-plug 70 for the introduction of additional cooling liquid when necessary and a gauge 71 for indicating the pressure of the liquid in the tank. The reservoir 67 is preferably pressurized in order to insure the flow of liquid to the frictional mechanism under all conditions of operation, and this pressurizing may be accomplished by connecting the reservoir to a source of fluid pressure 72, such as an air pressure tank on a vehicle or airplane, this air pressure tank being connected to the reservoir 67 through conduit 73, pressure reducing valve 74, conduit 75, shut-off valve 76 and conduit 77, it being understood that the reducing valve is preferably so constituted as to maintain a constant predetermined pressure in the reservoir 67, regardless of the level of the liquid therein, and regardless of the pressure of the air in the air tank 72. In connection with the description immediately preceding, it will be understood that in view of the fact that the relief valves 61 in the mechanism are set to relieve or discharge vapor therefrom when the pressure reaches a predetermined value such as 5 lbs., for example, the pressure in the supply reservoir 67 should exceed this 5 lb. pressure in order to insure the flow of liquid from the reservoir to the cooling chamber 13 whenever the inlet valve is opened. To this end, the pressure reducing valve 74 may be set to maintain a higher pressure such as 8 or 10 lbs., for example, depending on the rate at which the liquid in the cooling chamber 13 has to be replaced in order to compensate for the liquid lost in vapor or steam through the discharge valves 61. This of course can be readily determined when the brake is initially tested.

In the operation of a mechanism of this type, there are several different conditions that have to be considered in order to insure successful and satisfactory operation. One of these conditions is the matter of wheel balance when the wheel is rotating, and in view of the fact that the float 56 may assume different positions radially during operation of the mechanism, it will be understood that in the event a single float and valve mechanism is provided, this under some conditions of operation could cause an out of balance condition in the wheel. Consequently, in the embodiment shown, two such valve and float mechanisms are provided spaced angularly 180° apart on the drum member and at equal distances from the axis, this being indicated in the upper portion of Fig. 2 of the drawings. When the wheel is rotating at any appreciable speed, the liquid in the reservoir 13 will all be thrown to the outside of the chamber, and the level of the liquid tending to support the two floats will be the same or substantially the same at both the top and the bottom of the wheel, and the only condition tending to vary the relative radial positions of the two oppositely disposed floats will be the weight of the float itself which will tend to make the float which is uppermost on the wheel come slightly nearer to the axis of rotation of the wheel than the float positioned at the bottom of the wheel 180° therefrom. Since at any appreciable speed the predominating forces acting on the floats will be centrifugal force, it will be understood that the centrifugal force will appreciably exceed the force exerted due to the slight weight of the floats, and that consequently the amount of unbalance will be very slight under all conditions of the operation. In any case, the floats should be positioned so the resultants of the centrifugal forces on the floats through the axis, should be balanced so as to cancel out. When the wheel is rotating at any appreciable speed, the action of the floats and the opening and closing of the inlet valves will be controlled entirely by centrifugal force acting radially outward on the floats, and by the buoyancy of the floats in the cooling liquid acting radially inward on the floats to permit the closing of the valves by the biasing springs 55a.

It is also desirable that with the float and valve mechanism near what may be called at bottom dead center with the wheels stationary, or in the event a plurality of valves and floats are utilized and with one of the float and valve assemblies at bottom dead center that the weight of the float be sufficient to open the valve against the force exerted by the biasing spring 55a except when the float is moved to the position shown by the buoyancy of the liquid in the chamber 13. This insures that when the mechanism is put into initial operation on an airplane, for example, with the float and valve assembly or one of these assemblies at bottom dead center and with the liquid in the supply tank 67 pressurized as heretofore described, the valve at bottom dead center will be effective to automatically supply cooling liquid to the chamber 13 until the float closes the valve. This can be easily accomplished by rotating the wheel immediately following installation so that one of the valves is at bottom dead center, thus making it unnecessary to introduce liquid into the chamber 13 in any other manner. On the other hand, it will be noted that when a valve assembly is at 90° from bottom dead center, for example, the weight of the float will have no effect whatsoever on the action of the valve when the wheel is stationary, but in view of the fact that the valve is a balanced valve, it is impossible for the pressure of the supply liquid in the passage 38 to open the valve. The same is true when the valve and float assembly is at top dead center. This arrangement is important, since it precludes flooding of the mechanism and consequent loss of unvaporized liquid through the discharge valve 61 whenever the brake mechanism is operating. In connection with the latter statement, it should be noted that the discharge valves are located as near as possible to the central portion of the chamber 13 and it is contemplated that whenever the wheel is rotating, the level of the liquid will be such that no solid liquid can be discharged to these valves. This can be accomplished by the proper adjustment of the float and valve mechanism, as will be well understood by those skilled in the art.

In view of the foregoing, it will be understood that with the wheel stationary, no liquid can be admitted to the chamber 13 except when the valve and float mechanism is at substantially bottom dead center, and that under this condition only enough liquid can be admitted to cause the float to move upward and permit closing of the valve by the biasing spring 55a. The amount of liquid admitted under this condition is such, assuming proper arrangement of the parts, that when the wheel subsequently rotates with sufficient speed to force all of the liquid radially outward in the chamber 13, the level of the liquid will be such that no solid liquid can be discharged through the valves 61. When the wheel rotates at an appreciable speed, the liquid, as heretofore stated, is substantially uniformly distributed around the outer portion of the annular chamber 13, and the admission of liquid is then controlled by the centrifugal force acting on the float in one direction, the buoyancy of the float in the liquid in the opposite direction, and by the biasing spring 55a, which together with the buoyancy of the float in the liquid, opposes radial outward movement of the float about the pivot 57 in a counterclockwise direction by centrifugal force acting on the float.

Thus means have been provided for automatically maintaining a suitable volume of cooling liquid in the chamber 13. When any appreciable amount of heat is applied to the friction element 16, which is preferably formed of a metal such as copper or silver or high conductivity alloys thereof, this heat is rapidly conducted to the inner surface of the element and thence to the cooling liquid, which boils rapidly, evolving vapor or steam which, when the pressure exceeds that for which the discharge valves 61 are set, is discharged directly to atmosphere. It will be understood, that by discharging vapor or steam in this manner, an extremely large amount of heat can be absorbed for a given weight of cooling liquid, and that consequently the amount of cooling liquid which must be carried on an airplane, for example, in the reservoir 67 and in the chamber 13 of the brake mechanism, is very low compared to that which would be necessary in a recirculating brake cooling system, this resulting in a considerable weight saving when the mechanism is applied to an airplane. Since airplane brakes are used only at intervals, and can be readily serviced after each landing, it will be seen that the above invention presents great advantages for this type of service.

With regard to the foregoing, it has been found that in connection with liquid cooled frictional mechanisms such as brakes or clutches, the use of a metal friction element formed primarily of a metal selected from a group consisting of copper and silver and certain alloys thereof is very advantageous, and this is particularly true in the present instance where it is desired to transmit heat to the cooling liquid with sufficient rapidity to cause violent boiling and consequent dissipation of heat at an extremely high rate. Assuming that the friction element 16 is made of copper for example, it will be understood that the heat is very rapidly transferred from the outer surface to the inner surface of the copper element, and that it is thereafter rapidly transferred to the cooling liquid which is maintained in intimate contact with the copper surface due to centrifugal force acting on the liquid when the wheel is rotating. The resulting vapor or steam when the liquid is boiling rises to the surface of the liquid, which in this case means that the steam or vapor moves toward the center of the drum or cooling chamber, since the pressure in this region is less than it is adjacent the inner surface of the copper friction element. In the event of violent boiling of the cooling liquid, the gobules of water or the cooling liquid which tend to be thrown off the surface of the liquid, are rapidly thrown back toward the liquid by centrifugal force, and therefore are not discharged in liquid form through the discharge valves 61. Although copper is the preferred metal for the friction element 16, it will be understood that other suitable metals can be utilized, or that the element may in certain circumstances be formed integral with the wheel 4.

In connection with the foregoing description and the following claims, it is to be understood that the term frictional mechanism is intended to include clutches, brakes and other similar mechanisms, wherein two friction elements which are moving relative to each other are brought together in frictional engagement with the resultant generation of heat.

Although the invention has been illustrated and described with considerable particularity, it is to be understood by those skilled in the art that the invention may take other equivalent forms, reference being had to the appended claims for a definition of the limits of the invention.

What is claimed is:

1. Liquid cooled frictional mechanism including a rotatable cylindrical drum member having an annular cooling liquid chamber therein, a wall for the chamber having an outer surface adapted to be engaged by a friction element and an opposite inner surface exposed in said chamber, a cooling liquid inlet valve in said member, means for biasing said valve to closed position, means for connecting the valve to a source of cooling liquid outside of the rotatable drum member, means for discharging vaporized cooling liquid from the chamber, and a float in said chamber mounted for rotation with the drum member and having an operative connection with said valve, said float during rotation of the drum member being movable in one direction by centrifugal force to open the valve to admit cooling liquid to the chamber and being movable in the opposite direction by the buoyancy of the float in the liquid to permit closing of the valve by said biasing means.

2. Liquid cooled frictional mechanism as set forth in claim 1 wherein said valve is a balanced valve having an area acted on by the pressure in the chamber tending to move the valve in one direction and an area substantially equal to the first named area acted on by the pressure in the chamber tending to move the valve in the opposite direction, the forces exerted on said areas by said pressure being opposite and substantially equal.

3. Liquid cooled frictional mechanism as set forth in claim 1, wherein a plurality of said inlet valves, biasing means and floats are included in the drum member circumferentially spaced with respect to each other about the drum member, said valves, biasing means and floats being so positioned that the resultants of the forces exerted thereby on the drum member due to centrifugal force acting through the axis thereof when the member is rotating are substantially balanced and substantially cancel out.

4. Liquid cooled frictional mechanism as set forth in claim 1, wherein said float is pivotally mounted for rotation about an axis substantially perpendicular to a plane passing through the axis of the drum member.

5. Liquid frictional mechanism as set forth in claim 1, wherein said valve is a balanced valve having an area acted on by the pressure in the chamber and by the pressure in the means for connecting the valve to a source of cooling liquid tending to move the valve in one direction and an area substantially equal to the first named area acted on by said pressures tending to move the valve in the opposite direction, the forces exerted on said areas by said pressures being opposite in direction and substantially equal.

6. Liquid cooled frictional mechanism including a rotatable cylindrical drum member having an annular cooling liquid chamber therein, a cylindrical wall for the chamber having an outer surface adapted to be engaged by a friction element and an opposite inner surface exposed in said chamber, a cooling liquid inlet valve in said member, means for biasing said valve to closed position, a source of cooling liquid outside of the drum member, a cooling liquid connection between said source and valve, relief valve means in said drum member for discharging vapor from said chamber, said valve means being set to discharge vapor from the chamber when the pressure therein exceeds the pressure outside of the chamber by a predetermined value, a float in said chamber mounted for rotation with the drum member and having an operative connection with said inlet valve, said float during rotation of the drum being movable in one direction by centrifugal force to open the inlet valve to admit cooling liquid to the chamber from said source through said cooling liquid connection and being movable in the opposite direction by the buoyancy of the float in liquid in the chamber to permit closing of the valve by said biasing means, and means for maintaining the pressure of liquid in said cooling liquid connection at a pressure greater than that for which said relief valve is set.

7. Liquid cooled frictional mechanism as set forth in claim 6, wherein said inlet valve is a balanced valve acted on substantially equally in opposite directions by the pressure in said chamber and also by the pressure of liquid in said cooling liquid connection, whereby the opening and closing of said valve is controlled solely by the action of said float and the action of said biasing means.

8. Liquid cooled frictional mechanism including a rotatable cylindrical drum member having an annular liquid cooling chamber therein, a wall for the chamber having an outer surface adapted to be engaged by a friction element and an opposite inner surface exposed in the chamber, a cooling liquid inlet valve carried by said member, means for connecting said valve to a source of cooling liquid outside of the rotatable drum member, means for discharging vaporized cooling liquid from the chamber, a float in said chamber mounted for rotation with the drum member and having an operative connection with said valve, said float during rotation of the drum member being movable in one direction by centrifugal force to open the valve to admit the cooling liquid to the chamber and being movable in the opposite direction by the buoyancy of the float in liquid in the chamber to permit movement of the valve to closed position, and biasing means for moving said valve to closed position, the biasing means and the weight of the float being so constituted with respect to each other that with the drum member stationary in a position of rotation wherein the float is substantially at bottom dead center, the weight of the float exerts sufficient force to open the valve against the action of the biasing means, except when the level of the liquid in said chamber is high enough to raise the float sufficiently to permit closing of the valve by said biasing means.

9. Liquid cooled frictional mechanism as set forth in claim 8, wherein the valve is mounted for pivotal movement about an axis, said axis being substantially horizontal when the float is at substantially bottom dead center.

10. Liquid cooled frictional mechanism including a rotatable member having a cooling liquid chamber therein, one wall of the chamber having an outer surface adapted to be engaged by a friction element and an opposite inner surface exposed in said chamber, a cooling liquid inlet valve carried by said member, means for biasing said valve to closed position, means for connecting said valve to a source of cooling liquid, means for discharging vaporized cooling liquid from said chamber, and a float in said chamber mounted for rotation with the member and having an operative connection with said inlet valve, said float during rotation of the member being movable in one direction by centrifugal force to open said inlet valve and being movable in the opposite direction by the buoyancy of the float in a cooling liquid in the chamber to permit closing of said valve by said biasing means.

11. Liquid cooled frictional mechanism including a rotatable member having a chamber for cooling liquid therein, one wall of the chamber having an outer surface adapted to be engaged by a friction element and an opposite inner surface exposed in the chamber, a connection for supplying cooling liquid to the chamber, means for discharging vaporized cooling liquid from the chamber, and means for controlling the flow of cooling liquid through said connection including a valve associated with said connection and means carried by said member responsive to centrifugal force and to the buoyancy of liquid in said chamber having an operative connection with said valve.

References Cited in the file of this patent

UNITED STATES PATENTS

| | | |
|---|---|---|
| 1,952,967 | Boughton | Mar. 27, 1934 |
| 2,111,335 | Sanford | Mar. 15, 1938 |
| 2,372,984 | Pierce | Apr. 3, 1945 |
| 2,719,620 | McDonald | Oct. 4, 1955 |
| 2,834,636 | Fawick | May 13, 1958 |

FOREIGN PATENTS

| | | |
|---|---|---|
| 61,205 | France | Oct. 20, 1954 |
| 653,565 | Great Britain | May 16, 1951 |
| 667,280 | Great Britain | Feb. 27, 1952 |